(12) United States Patent
Taguchi et al.

(10) Patent No.: US 10,137,779 B2
(45) Date of Patent: Nov. 27, 2018

(54) VEHICULAR IMAGE DISPLAY DEVICE AND VEHICULAR IMAGE DISPLAY METHOD

(71) Applicant: DENSO CORPORATION, Kariya, Aichi-pref. (JP)

(72) Inventors: Kiyotaka Taguchi, Kariya (JP); Tokio Haruta, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 12 days.

(21) Appl. No.: 15/314,126

(22) PCT Filed: Jun. 16, 2015

(86) PCT No.: PCT/JP2015/003007
§ 371 (c)(1),
(2) Date: Nov. 28, 2016

(87) PCT Pub. No.: WO2015/198558
PCT Pub. Date: Dec. 30, 2015

(65) Prior Publication Data
US 2017/0190254 A1     Jul. 6, 2017

(30) Foreign Application Priority Data

Jun. 25, 2014   (JP) .................. 2014-130707

(51) Int. Cl.
| G09G 5/00 | (2006.01) |
| B60K 35/00 | (2006.01) |
| G06F 3/0484 | (2013.01) |
| G01C 21/36 | (2006.01) |

(52) U.S. Cl.
CPC .......... B60K 35/00 (2013.01); G06F 3/04847 (2013.01); *B60K 2350/1076* (2013.01);
(Continued)

(58) Field of Classification Search
CPC ........... G08G 1/096775; G08G 1/0129; G08G 1/0967
See application file for complete search history.

(56) References Cited

U.S. PATENT DOCUMENTS

2006/0142941 A1* 6/2006 Imai .................. G01C 21/3638
701/431
2008/0192024 A1 8/2008 Mita
(Continued)

FOREIGN PATENT DOCUMENTS

DE    102008016527 A1   3/2009
JP    H03137688 A       6/1991
(Continued)

OTHER PUBLICATIONS

Hiroaki Tanaka et al., "Trend of HMI (Human Machine Interface) Technology in DENSO", Aug. 30, 2013.

*Primary Examiner* — Nan-Ying Yang
(74) *Attorney, Agent, or Firm* — Harness, Dickey & Pierce, P.L.C.

(57) ABSTRACT

A vehicular image display device includes a detection unit, a setting image display unit, an image change unit, and a previous notice execution unit. The image change unit changes a setting image of a display screen displayed by the setting image display unit to a setting disable image indicating that a setting of an operation content for a vehicle-mounted device is disabled and including a display of a vehicle speed when the detection unit detects the travel start of the vehicle. The previous notice execution unit executes a previous notice display by continuously moving a boundary between an area in which the setting image is displayed and an area in which the setting disable image is displayed on the display screen so as to increase the area of the setting disable image, prior to a change to the setting disable image.

3 Claims, 15 Drawing Sheets

(52) U.S. Cl.
CPC .. *B60K 2350/352* (2013.01); *B60K 2350/901* (2013.01); *B60K 2350/92* (2013.01); *B60K 2350/962* (2013.01); *G01C 21/3667* (2013.01)

(56) References Cited

U.S. PATENT DOCUMENTS

| | | |
|---|---|---|
| 2008/0309475 A1 | 12/2008 | Kuno et al. |
| 2011/0032268 A1 | 2/2011 | Takei |
| 2011/0090074 A1 | 4/2011 | Kuno et al. |
| 2011/0106365 A1 | 5/2011 | Miyake et al. |
| 2012/0242687 A1* | 9/2012 | Choi ................ B60K 35/00 345/629 |
| 2014/0210604 A1 | 7/2014 | Kawashima et al. |
| 2015/0287244 A1* | 10/2015 | Watanabe ........... G06T 19/006 345/633 |
| 2015/0328987 A1 | 11/2015 | Nagao et al. |
| 2016/0303975 A1 | 10/2016 | Nagao et al. |

FOREIGN PATENT DOCUMENTS

| | | |
|---|---|---|
| JP | H11004411 A | 1/1999 |
| JP | 2002331120 A | 11/2002 |
| JP | 2007024519 A | 2/2007 |
| JP | 2007045169 A | 2/2007 |
| JP | 2007199026 A | 8/2007 |
| JP | 2011033943 A | 2/2011 |
| JP | 2011096058 A | 5/2011 |
| JP | 2011109286 A | 6/2011 |
| JP | 2012047925 A | 3/2012 |
| JP | 2014145999 A | 8/2014 |
| WO | WO-2013094066 A1 | 6/2013 |

* cited by examiner

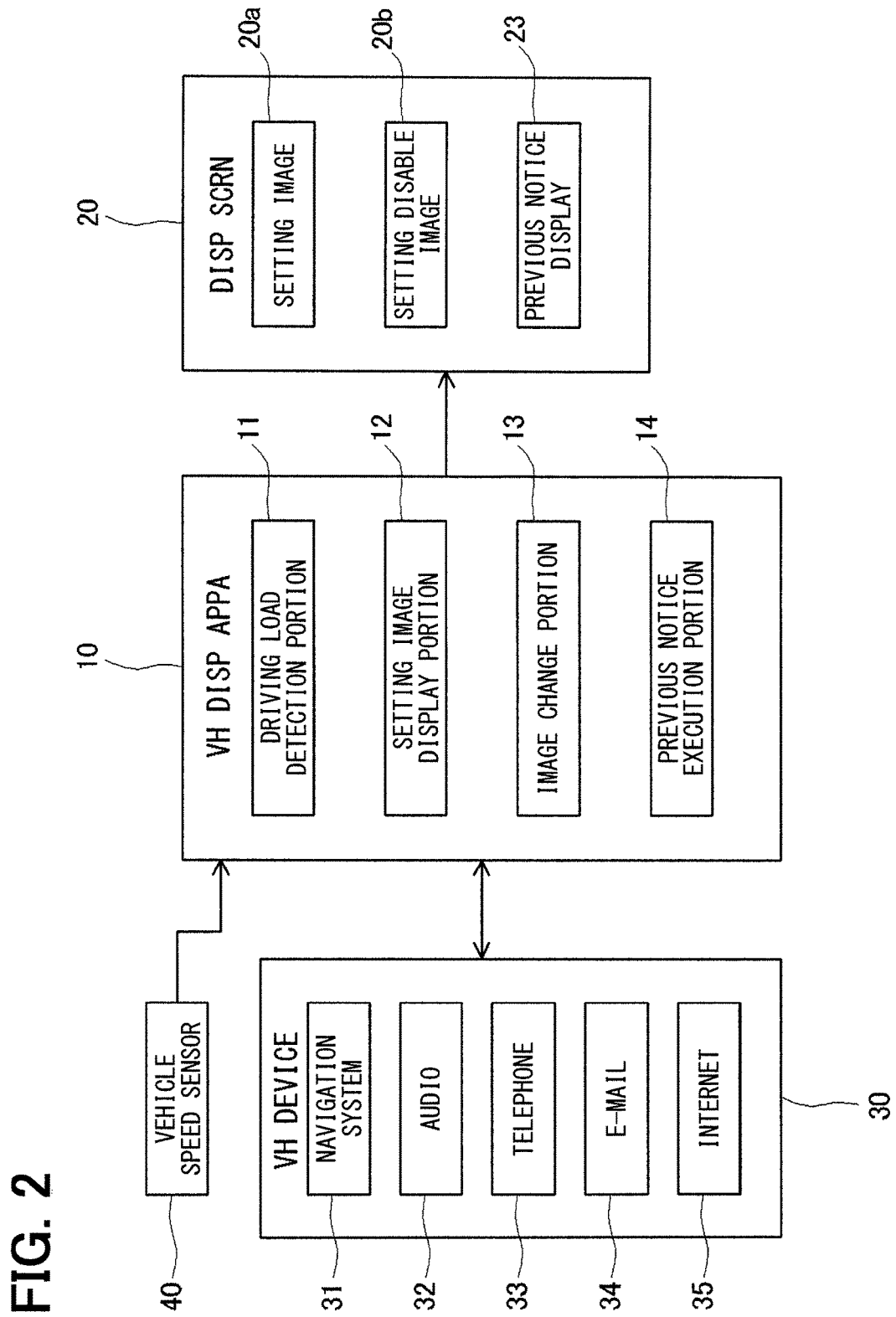

VEHICULAR IMAGE DISPLAY DEVICE AND VEHICULAR IMAGE DISPLAY METHOD

CROSS REFERENCE TO RELATED APPLICATIONS

This application is a U.S. National Phase Application under 35 U.S.C. 371 of International Application No. PCT/JP2015/003007 filed on Jun. 16, 2015 and published in Japanese as WO 2015/198558 A1 on Dec. 30, 2015. This present application is based on and claims the benefit of priority from Japanese Patent Application No. 2014-130707 filed on Jun. 25, 2014. The entire disclosures of all of the above applications are incorporated herein by reference.

TECHNICAL FIELD

The present disclosure relates to a vehicular image display device and a vehicular image display method for displaying an image on a display screen mounted at a position viewable from a driver seat.

BACKGROUND ART

In current vehicles, various vehicle-mounted devices are mounted for enabling a driver to drive comfortably and safely. For example, a navigation system (hereinafter referred to as "navigation system") for guiding a driving direction to a destination and an audio equipment for reproducing music are mounted in the vehicle. In order to operate the vehicle-mounted devices, it is necessary that the driver sets the destination and the music for the devices. In order to facilitate the setting operation, a technique in which a display screen is mounted at a position where the driver can easily see in a vehicle interior, and various information on the setting operation is displayed on the display screen has been widespread.

When the setting operation of the vehicle-mounted devices is performed while the vehicle is traveling, the driving operation may be hindered. Under the circumstances, while the vehicle is traveling, the operation of setting the vehicle-mounted device by the driver is not accepted, and an image on the display screen is displayed on a mode (for example, luminance or contrast is lowered) different from a normal mode. Because the driver performs the setting operation while checking the display screen, if the display screen is different in the display mode from the normal display screen, the driver can immediately recognize that the setting operation is not accepted (Patent Literature 1).

However, there arises such an issue that even after the display screen has been changed to the display mode different from the normal mode in association with the travel start of the vehicle, there is a tendency for the driver to continue the operation of the vehicle-mounted device for a while. This is because, even though the driver is aware that the display mode has been switched to another during the operation of setting the device and recognizes that the setting operation is no longer enabled, the driver cannot immediately accept that the setting operation is interrupted in a halfway state.

In addition, the same situation can occur even when the display mode indicating that the vehicle-mounted device cannot be operated has been switched to the normal display mode indicating that the vehicle-mounted device can be operated in association with a fact that the vehicle-mounted device becomes operable, for example, the vehicle stops. In other words, aside from a case in which the driver is waiting for the vehicle-mounted device to become operable, normally, the driver thinks of operating or recalls the content of the interrupted operation after the driver is aware that the vehicle-mounted device becomes operable. Therefore, it takes a long time to actually start the operation.

PRIOR ART LITERATURES

Patent Literature

[Patent Literature 1] JP 2007-024519 A

SUMMARY OF INVENTION

In view of the foregoing difficulties, it is an object of the present disclosure to provide a vehicular image display device and a vehicular image display method which enable a driver to quickly switch his feeling in response to switching between a state in which a setting operation is enabled and a state in which the setting operation is disabled.

A vehicular image display device that controls a display of a display screen mounted at a position visible from a driver seat according to an aspect of the present disclosure, includes: a detection unit that detects a travel start of a vehicle; a setting image display unit that displays a setting image for setting an operation content for a vehicle-mounted device; an image change unit that changes the setting image of the display screen to a setting disable image indicating that the setting of the operation content for the vehicle-mounted device is disabled and including a display of a vehicle speed when the detection unit detects the travel start of the vehicle; and a previous notice execution unit that executes a previous notice display by continuously moving a boundary between an area in which the setting image is displayed and an area in which the setting disable image is displayed on the display screen so as to increase the area of the setting disable image, prior to a change to the setting disable image.

The above-described device enables a driver to quickly switch his feeling in response to switching between a state in which the setting operation is enabled and a state in which the setting operation is disabled.

A vehicular image display method for controlling a display of a display screen mounted at a position visible from a driver seat according to another aspect of the present disclosure, includes: determining whether a setting image for setting an operation content for a vehicle-mounted device is being displayed; determining whether a vehicle starts to travel; changing the setting image on the display screen to a setting disable image indicating that the setting of the operation content for the vehicle-mounted device is disabled and including a display of a vehicle speed when the vehicle starts to travel; and previously notifying that the setting disable image is to be displayed by continuously moving a boundary between an area in which the setting image is displayed and an area in which the setting disable image is displayed on the display screen so as to increase the area of the setting disable image, prior to a change to the setting disable image.

The above-described method enables a driver to quickly switch his feeling in response to switching between a state in which the setting operation is enabled and a state in which the setting operation is disabled.

BRIEF DESCRIPTION OF DRAWINGS

The above and other objects, features and advantages of the present disclosure will become more apparent from the following detailed description made with reference to the accompanying drawings. In the drawings:

FIG. 2 is a block diagram illustrating the vehicular image display device according to the first embodiment;

DESCRIPTION OF EMBODIMENTS

Hereinafter, embodiments will be described for clarifying the details of the above-described present disclosure.

First Embodiment

Figure 1A:
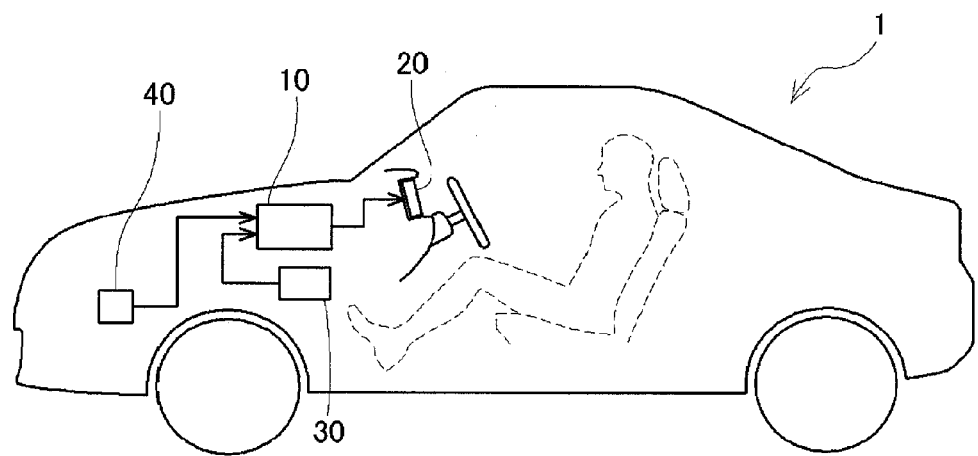
FIG. 1A is a diagram illustrating a vehicle in which a vehicular image display device according to a first embodiment of the present disclosure is mounted.
Figure 1B:
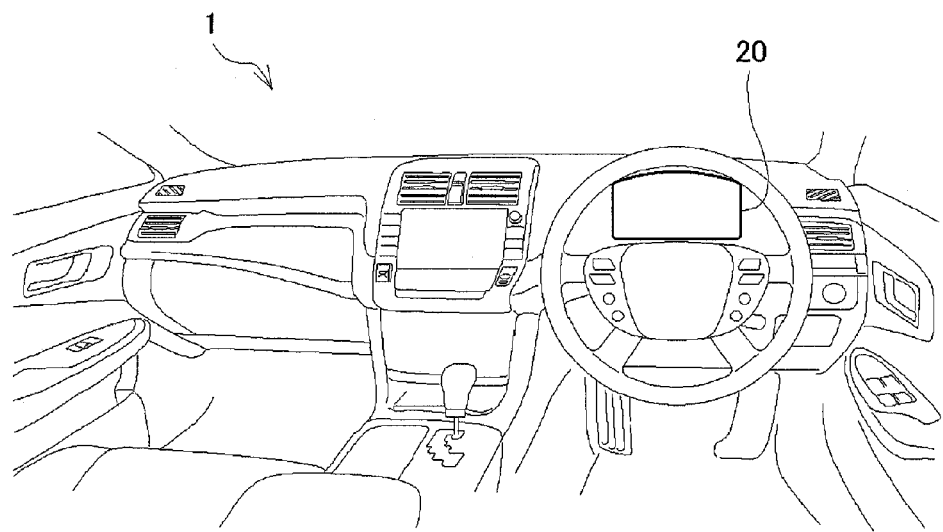
FIG. 1B is a diagram illustrating a rough internal configuration of the vehicle in which the vehicular image display device is mounted.

FIGS. 1A and 1B illustrate rough internal configurations of a vehicle 1 in which a vehicular image display device (VH DISP APPA) 10 is mounted. As illustrated in FIG. 1, the vehicle 1 includes the vehicular image display device 10 that controls a display of an image, a display screen (DISP SCRN) 20 that is provided in a vehicle interior, a vehicle-mounted device (VH DEVICE) 30 that is adjunctively mounted in the vehicle 1, and a vehicle speed sensor 40 that detects a traveling state of the vehicle 1.

The vehicular image display device 10 is an electronic control unit that receives signals from the vehicle-mounted device 30 and the vehicle speed sensor 40, calculates a display control according to a program executed by a CPU, and outputs the display control to the display screen 20.

The vehicular image display device 10 is not always realized by one unit, and a function of the vehicular image display device 10 may be realized in association with multiple control units.

The display screen 20 displays various pieces of information according to a control of the vehicular image display device 10. FIG. 1B illustrates the display screen 20 viewed from the driver seat.

The vehicle-mounted device 30 is an ancillary attachment device (for example, navigation system or audio) mounted for purposes other than the driving operation of the vehicle, that is, for the purpose of improving the comfort, the drivability, and the safety of the vehicle 1. In addition, a variety of driver assistance systems, safety systems, and communications systems that enables a connection to the internet, which are realized with the use of a control device correspond to the vehicle-mounted device 30.

The vehicle speed sensor 40 detects a speed (hereinafter referred to as "vehicle speed") of the vehicle 1, and outputs a signal corresponding to the vehicle speed.

FIG. 2 illustrates a block diagram of the vehicular image display device 10 according to the present embodiment.

As shown in FIG. 2, the vehicular image display device 10 includes a driving load detection unit 11, a setting image display unit 12, an image change unit 13, and a previous notice execution unit 14. The vehicular image display device is communicatively connected to the vehicle-mounted device 30, and further outputs various data to the display screen 20 to control a display of an image on the display screen 20.

The four "units" do not represent that an interior of the vehicular image display device 10 is physically divided, and also do not represent that a display area of the display screen 20 is divided, but represent concepts obtained by classifying the functions performed by the vehicular image display device 10. Therefore, the "units" can be realized as computer programs executed by the CPU, can be realized as an electronic circuit including an LSI and a memory, or can be realized by combination of the computer programs with the electronic circuit.

The driving load detection unit 11 acquires information on a travel speed of the vehicle 1 from a vehicle speed sensor for the purpose of detecting a driving load of a driver, and detects a travel start of the vehicle 1. In the present embodiment, the driving load of the driver is detected on the basis of the travel speed of the vehicle 1. Alternatively, the driving load may be detected on the basis of other information. For example, the driving load of the driver may be detected by the detection of the operation amount of an accelerator, the operation amount of a steering, the operation amount of a brake, the presence or absence of the operation of a direction indicator, or a situation around the vehicle (a state of a traffic signal or an inter-vehicle distance). Alternatively, the driving load may be detected by the detection of information on a driver body such as a heartbeat, a pulse, a blood pressure, an exercise, or an eye movement of the driver. It is needless to say that the driving load can be detected by the combination of detection results of those various piece of information. In addition, not only whether the driver load is applied is simply detected, but also the degree of driving load applied on the driver may be detected by a method of comparing the detection results of those pieces of information with a predetermined threshold.

The setting image display unit 12 displays a setting image 20a used for the operation of setting the vehicle-mounted device 30. The "operation of setting the vehicle-mounted device 30" represents operation other than the direct driving operation of the vehicle 1 and represents operation for setting the operation content of the vehicle-mounted device 30. A specific example of the setting image 20a will be described later.

The image change unit 13 changes the setting image 20a displayed on the display screen 20 to a setting disable image 20b after the travel start of the vehicle 1 has been detected by the driving load detection unit 11. In the present specification, the setting disable image 20b represents an image indicating that the operation content of the vehicle-mounted device 30 cannot be set. However, the setting disable image 20b does not need to be an image "directly indicating that the operation content cannot be set", but corresponds to the setting disable image 20b if the image enables the driver to recognize that the operation of setting the vehicle-mounted device 30 is disabled. Therefore, for example, "the image to be displayed when the operation content cannot be set" corresponds to the setting disable image 20b because the image can become "the image indicating that the operation content cannot be set".

The previous notice execution unit 14 executes a previous notice display 23 for previous notifying the driver that the setting disable image 20b is to be displayed before changing the setting image 20a to the setting disable image 20b. Although the content of the previous notice display 23 will be described in detail later, with the execution of the previous notice display 23, the driver can be prevented from continuing the operation of setting the vehicle-mounted device 30 even after the vehicle 1 starts to travel.

Hereinafter, a description will be given of a traveling display control process to be executed by the vehicular image display device 10 for the purpose of realizing the above feature according to the present embodiment.

Figure 3:
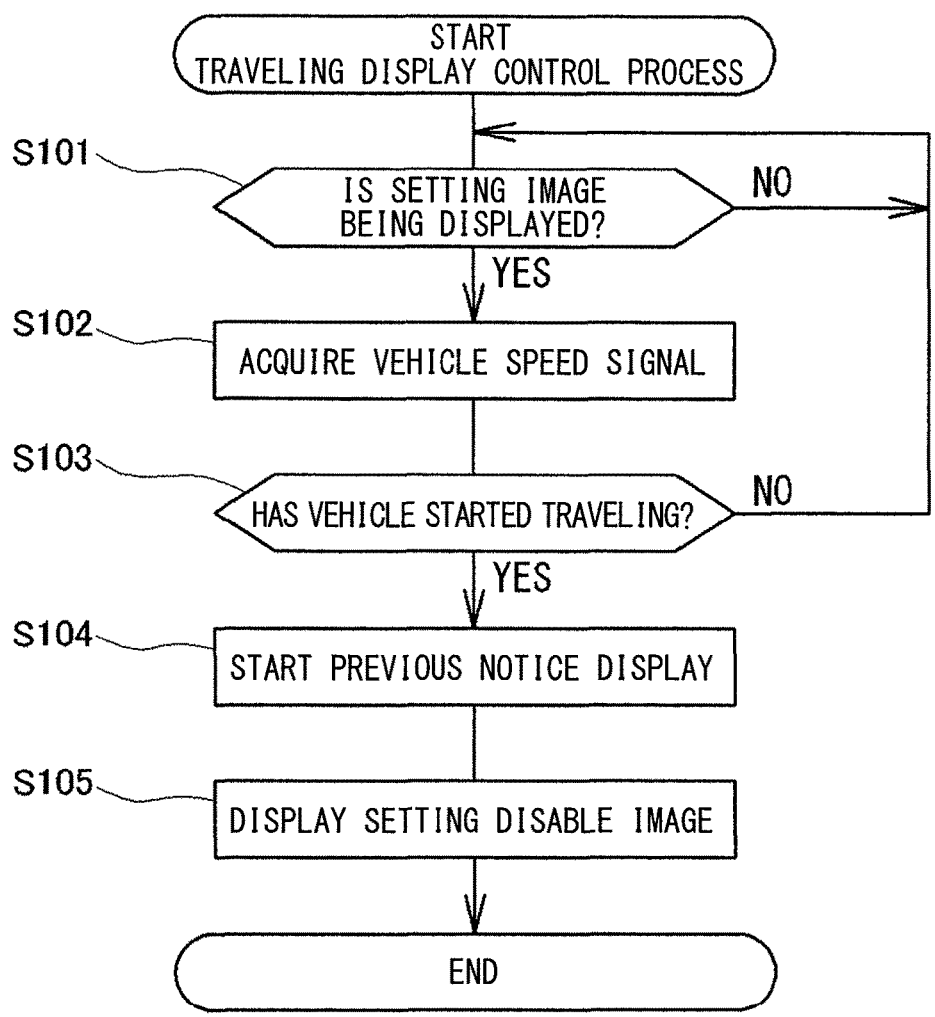
FIG. 3 is a flowchart illustrating a traveling display control process performed by the vehicular image display device according to the first embodiment.

FIG. 3 illustrates a flowchart of a traveling display control process to be performed by the vehicular image display device 10 according to the present embodiment. In the traveling display control process, first of all, it is determined whether the setting image 20a is being displayed (S101). The setting image 20a will be described with reference to FIG. 4.

Figure 4:
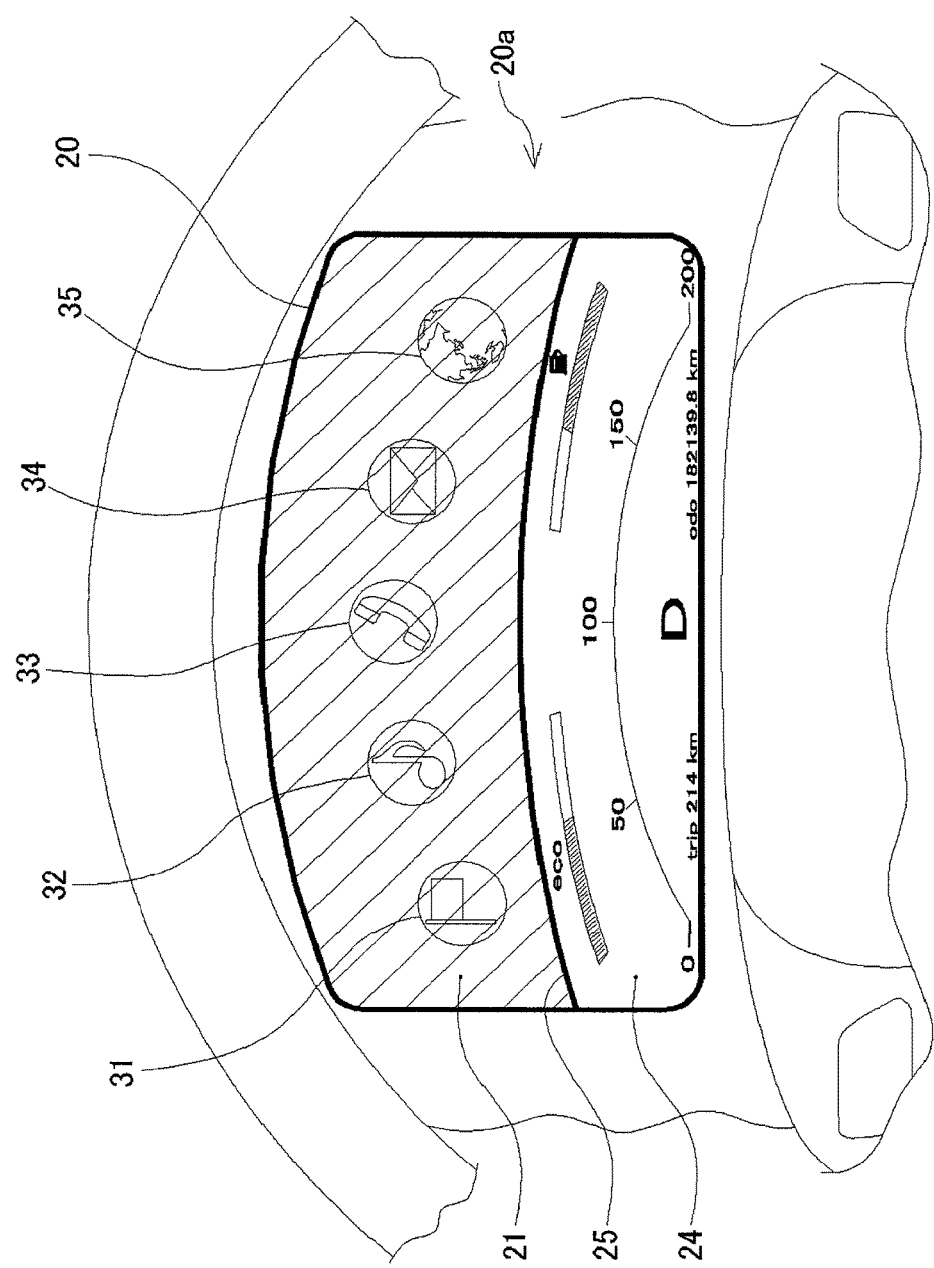
FIG. 4 is a partially enlarged view illustrating a state in which a display screen on which a setting image according to the first embodiment is displayed is viewed from a driver seat.

FIG. 4 illustrates a state in which the setting image 20a displayed on the display screen 20 is viewed from the driver seat. First of all, the display screen 20 will be described. As shown in FIG. 4, the display screen 20 is a substantially rectangular screen which is horizontally long and has an arc-shaped upper edge center projecting upward. The display screen 20 is divided into two pieces of an upper region (setting operation region 21) and a lower region (traveling display region 24) across an arc-shaped boundary 25. In FIG. 4, the setting operation region 21 is shaded.

In the traveling display region 24, information (for example, vehicle speed, engine speed, shift position) used for the driving operation while the vehicle is traveling is displayed. An image for setting the operation content for the vehicle-mounted device 30 such as the navigation system 31 or an audio 32 is displayed in the setting operation region 21. In an example shown in FIG. 4, an image for selecting which application of the navigation system 31, the audio 32, a phone 33, a mail 34, and an internet 35 is to be operated is displayed. The image displayed in the setting operation region 21 of FIG. 4 is an example, and it is needless to say that images sequentially developed according to the operation of the vehicle-mounted device 30 may be displayed.

As illustrated in FIG. 4, an overall image displayed on the display screen 20 becomes the setting image 20a in the present embodiment in a state where the boundary 25 is located below a center of the display screen 20, and an area of the setting operation region 21 is larger than (or equal to) an area of the traveling display region 24. As described above, when the setting image 20a is displayed, the setting image 20a shows a state in which the operation of setting the vehicle-mounted device 30 is enabled.

In the setting image 20a, an image displayed in the setting operation region 21 may be displayed with a sufficient size, and the setting operation region 21 of an area sufficient to perform the operation of setting the vehicle-mounted device 30 may be ensured. Therefore, even if a rate of the area of the setting operation region 21 in the display screen 20 is less than a half of the display screen 20, the image displayed on the display screen 20 can correspond to the setting image 20a.

In the traveling display control process of FIG. 3, when it is determined that the setting image 20a has not being displayed (NO in S101), the same determination (S101) is again repeated to keep a waiting state as it is until the setting image 20a is displayed.

On the other hand, when it is determined that the setting image 20a has being displayed (YES in S101), the vehicular image display device 10 acquires a vehicle speed signal from the vehicle speed sensor 40 (S102), and determines whether the vehicle 1 starts to travel (S103).

As a result, when it is determined that the vehicle 1 does not start to travel (NO in S103), the vehicular image display device 10 again returns to a confirmation of whether the setting image 20a is being displayed (S101). Thus, the above process is repeated until it is determined that the setting image 20a is displayed (YES in S101), and the traveling starts (YES in S103).

When it is determined that the vehicle 1 starts to travel (YES in S103), the vehicular image display device 10 starts the previous notice display 23 for getting the driver to previous notice that the display of the display screen 20 is to be changed from the setting image 20a to the setting disable image 20b (S104).

Meanwhile, in the present embodiment, when the vehicle 1 starts to travel, the vehicular image display device 10 determines that the driving load on the driver is increased, and starts the previous notice display 23 indicative of a change from the setting image 20a to the setting disable image 20b. However, when the operation amount of the steering or the heartbeat of the driver is detected, and the detection result exceeds a predetermined threshold, it may be determined that the driving load on the driver is increased, and the previous notice display 23 may start. In other words, when the vehicle 1 starts to travel, the operation amount of the steering or the heartbeat of the driver is detected, and the detection result exceeds the predetermined threshold, it is determined that the detection result of the driving load satisfies a predetermined condition, and a previous notice for changing the setting image 20a to the setting disable image 20b starts.

As described above with reference to FIG. 4, in the setting image 20a according to the present embodiment, the boundary 25 between the setting operation region 21 and the traveling display region 24 is located below the center of the display screen 20, and the setting operation region 21 is larger in area than the traveling display region 24. On the contrary, in the setting disable image 20b according to the present embodiment, the boundary 25 is moved above the center of the display screen 20, and the setting operation region 21 is displayed with an area smaller than that of the traveling display region 24. The display of the setting disable image 20b can indicate that the operation content of the vehicle-mounted device 30 cannot be set.

In the present embodiment, the previous notice display 23 is executed by continuously moving the boundary 25 upward on the display screen 20. As a result, the display of the display screen 20 is changed from a state in which the setting operation region 21 is displayed larger than the traveling display region 24 (a state in which the setting image 20a is displayed) to a state in which the setting operation region 21 is displayed smaller than the traveling display region 24 (a state in which the setting disable image 20b is displayed) through the previous notice display 23 (S105).

FIGS. 5A to 5D illustrate a series of states in which the previous notice display 23 starts from a state in which the setting image 20a is displayed, and the setting disable image 20b is displayed after the completion of the previous notice display 23. In this example, the upward movement of the boundary 25 is realized by expanding and deforming the traveling display region 24 upward. It is needless to say that the traveling display region 24 may be merely moved upward.

Figure 5A:
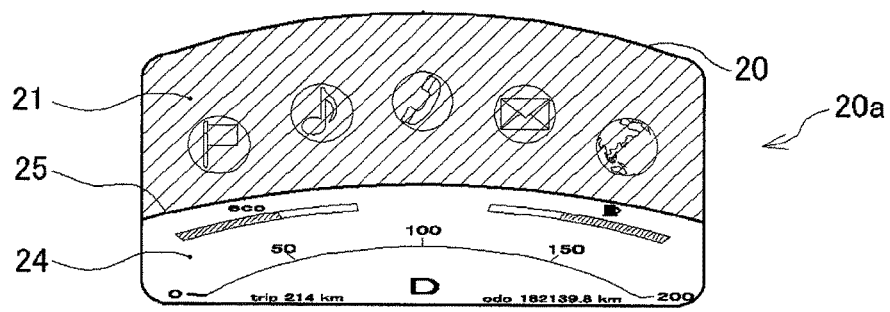
FIG. 5A is a diagram illustrating a state in which the setting image can be set on the display screen.

FIG. 5A illustrates the display screen 20 in a state where the setting image 20a is displayed, and the operation of setting the vehicle-mounted device 30 is enabled. In this case, the boundary 25 between the setting operation region 21 and the traveling display region 24 is located below the display screen 20. A time when the boundary 25 starts to move from this state toward the state of FIG. 5B is a start (S104) of the previous notice display 23.

Figure 5B:
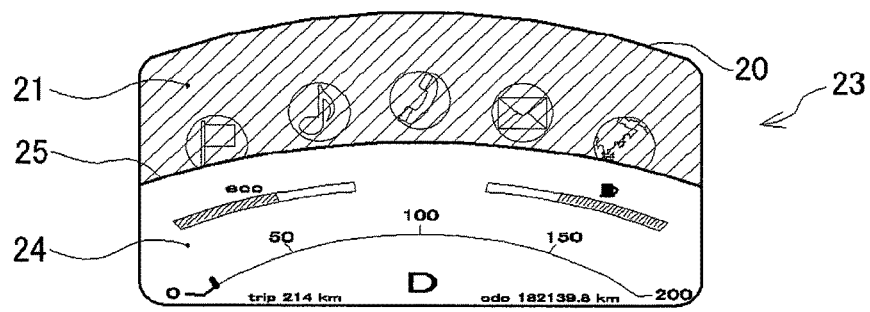
FIG. 5B is a diagram illustrating an appearance in which the setting image starts to become gradually smaller on the display screen.

FIG. 5B illustrates the display screen 20 in a state where the traveling display region 24 starts to be expanded and deformed upward. In this case, the boundary 25 is moved up to the middle, and the setting operation region 21 (a shaded portion) starts to be gradually decreased.

Figure 5C:
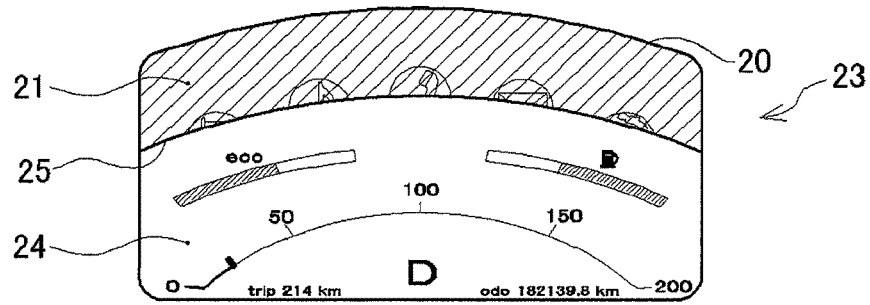
FIG. 5C is a diagram illustrating an appearance in which the setting image has become smaller on the display screen.

FIG. 5C illustrates the display screen 20 in a state where the traveling display region 24 is continuously expanded and deformed. In this situation, the setting operation region 21 is remarkably decreased.

Figure 5D:
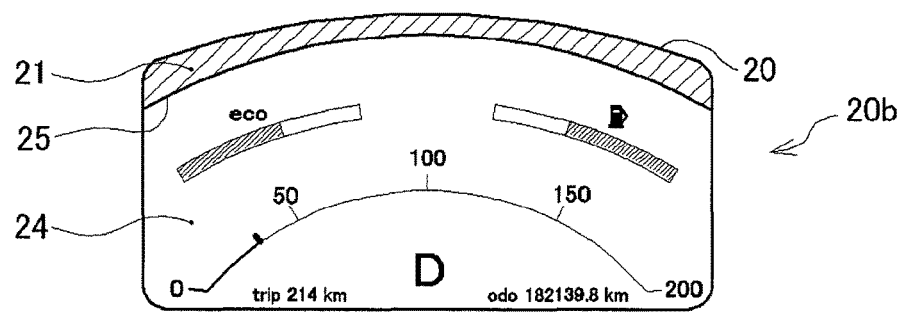
FIG. 5D is a diagram illustrating an appearance in which the setting image has been switched to a setting disable image on the display screen.

FIG. 5D illustrates the display screen 20 in a state where the expansion and the deformation of the traveling display region 24 are completed (a state in which the setting disable image 20b is displayed). In this situation, because the boundary 25 reaches an upper limit of a moving range, and the image of the setting operation region 21 is no longer visible, the setting operation region 21 does not function as an image display for the operation of setting the vehicle-mounted device 30 at all.

As described above, the change from the setting image 20a to the setting disable image 20b in the present embodiment is realized by gradually expanding and deforming the traveling display region 24 (FIG. 5A) displayed on the display screen 20 upward (FIGS. 5B and 5C), and obscuring various images displayed in the setting operation region 21 to display the setting disable image 20b (FIG. 5D).

The series of movement on the display screen 20 as described above affects driver consciousness as follows. First, in a state where the setting image 20a is displayed as illustrated in FIG. 5A, the driver recognizes that the operation content can be set for the various vehicle-mounted devices 30. In addition, the operation content may be actually being set, or to be set.

However, as illustrated in FIG. 5B, when the boundary 25 on the display screen 20 starts to be moved upward, and an area of the region (setting operation region 21) for setting starts to be decreased, the driver recognizes that the display on the display screen 20 is to be changed to the setting disable image 20b.

However, even if the boundary 25 starts to move up, the driver consciousness is not always immediately switched. In particular, in the case where the operation content is being set or to be set for the vehicle-mounted device 30, when the boundary 25 starts to move up suddenly at timing when the driver does not want to cancel the setting, the driver feels the setting operation not to be given up.

However, while the driver does not give up the setting operation, the boundary 25 moves up with a time, and the setting operation region 21 on the display screen 20 is narrowed more and more in association with the moving up of the boundary 25 (refer to FIG. 5C). This makes it difficult to continue the setting operation even if the driver tries to continue the setting operation. As a result, the driver thinks to have no choice but to give up the setting operation, and ultimately, as illustrated in FIG. 5D, the image in the setting operation region 21 is completely hidden in the traveling display region 24, and the driver completely gives up the setting operation.

As described above, the image is not merely switched from the setting image 20a to the setting disable image 20b, but the previous notice display 23 for the driver to recognize that the setting disable image 20b is to be displayed is performed. As a result, the driver consciousness can be switched at a time when at least the setting disable image 20b is displayed.

In particular, as described above, if a process for the display of the display screen 20 to switch from the setting image 20a to the setting disable image 20b is displayed as the previous notice display 23, the driver can be facilitated to switch his consciousness with a progress of the previous notice display 23. As a result, at a time when the previous notice display 23 has been completed (a time when the setting disable image 20b is displayed), the driver consciousness can be reliably switched.

As is apparent from the above description, a "predetermined time" during which the previous notice display 23 is performed is not satisfied by a time required for the driver to recognize a state in which the setting image 20a is changed to the setting disable image 20b, but is required to be a time during which the driver consciousness is changed by recognizing a state in which the image is changed. Normally, a time required for a human to recognize a target is 0.1 seconds, and a time required for the human to express some emotion in response to the recognition is also about 0.1 seconds. Therefore, a time of about 0.2 seconds is required at earliest. Further, when the "predetermined time" is too long, since the setting disable image 20b is not displayed, the driving of the vehicle 1 may suffer from a problem. Therefore, the time is required to be set to 5 seconds or less at the longest. From this viewpoint, the "predetermined time" is set to 0.2 to 5 seconds (more preferably, a time of about 0.5 to 2 seconds).

Further, in the above embodiment, the image displayed in the traveling display region 24 is an image displaying a vehicle speed or a rotating speed. If the image indicative of information important for the driving operation as described above is displayed in the traveling display region 24, when the display area of the traveling display region 24 is spread, the driver naturally confirms the display of the traveling display region 24. As a result, the driver consciousness can be led more directly to the driving operation.

In addition, the movement of the traveling display region 24, which is gradually expanded and deformed upward to terminate the display of the setting image 20a, attracts attention and gives an impression as if a door is closed to the driver. As a result, the driver more intuitively and easily understands that the image has been switched, that is, that the operation of the vehicle-mounted device 30 has been disabled.

Further, because the traveling display region 24 is displayed below with a small size in the setting image 20a (refer to FIG. 5A), the driver can confirm information in the traveling display region 24 even when the vehicle 1 is stopping. On the other hand, the traveling display region 24 is displayed with a large size in the setting disable image 20b (refer to FIG. 5D) whereby the information used for the driving operation can be displayed so as to be easily visible by the driver. Because the setting image 20a and the setting disable image 20b are displayed on the same display screen 20, the display screen 20 can be effectively utilized as compared with a case in which those images are displayed on individual display screens 20.

Meanwhile, the traveling display region 24 is not expanded and deformed vertically, but is moved merely vertically whereby the setting image 20a may be displayed or hidden.

The direction of moving or deforming the traveling display region 24 is not limited to the vertical direction as in the present embodiment, but the traveling display region 24 may be moved or deformed, for example, in a horizontal direction or in an oblique direction.

Further, the traveling display region 24 may be moved or deformed by moving forward (or backward) as a whole while repeating the forward and backward movements little by little in one previous notice display 23.

In the first embodiment, the image in the setting operation region 21 is visible during the previous notice display 23, and in this state, the operation of setting the vehicle-mounted device 30 may be enabled or disabled.

If the operation of setting the vehicle-mounted device 30 in this situation is enabled, the driver performs the final setting operation while the setting operation region 21 is narrowed, thereby being capable of easily switching his feeling.

On the contrary, if the operation of setting the vehicle-mounted device 30 is disabled, since the vehicle-mounted device 30 does not react to the driver setting operation, the driver is prompted to give up the setting operation, as a result of which the driver feeling can be more quickly switched.

Second Embodiment

In the first embodiment described above, the display screen 20 is disposed in an instrument panel provided in front of the driver seat (refer to FIG. 1B). However, the display screen 20 is not always provided in the instrument panel. For example, a display screen 220 can be disposed in a center console.

When the display screen 220 is disposed at a place other than the instrument panel, a configuration and contents for changing the display of the display screen 220 from a setting image 220a to a setting disable image 220b are also different from those when the display screen 20 is disposed in the instrument panel. Hereinafter, a description will be given of a second embodiment described above. In parts identical with those in the first embodiment, the description of the first embodiment is referred to, and the description will be focused on different parts.

Figure 6:
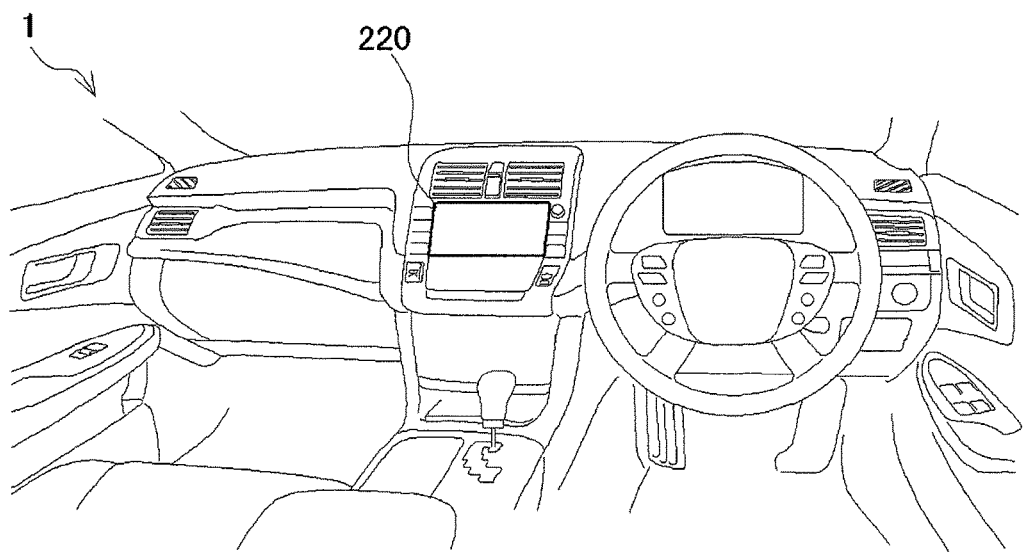
FIG. 6 is a partial view illustrating an interior of a vehicle indicative of a position of a display screen according to a second embodiment of the present disclosure.

FIG. 6 illustrates a position at which the display screen 220 is mounted according to the second embodiment. As shown in the figure, the display screen 220 according to the second embodiment is configured by a multi-display provided in a navigation system 231 disposed in a center console. As described above, the display screen 220 may be disposed at a position easily visible from the driver, and may be disposed on a dashboard in addition to the instrument panel and the center console provided in front of the driver seat.

A screen of a mobile terminal can be used as the display screen 220. For example, the present disclosure can be applied to even a case in which a function of switching an image for the setting operation to another image by starting the travel of the vehicle during the use of a navigation application of a smartphone is provided.

The display screen 220 has only to execute an instruction of the display by a vehicular image display device 210, and can be configured by any display screen using a reflected light or a transmitted light such as a head-up display or a head mount display regardless of a display method, in addition to a liquid crystal display.

Figure 7A:
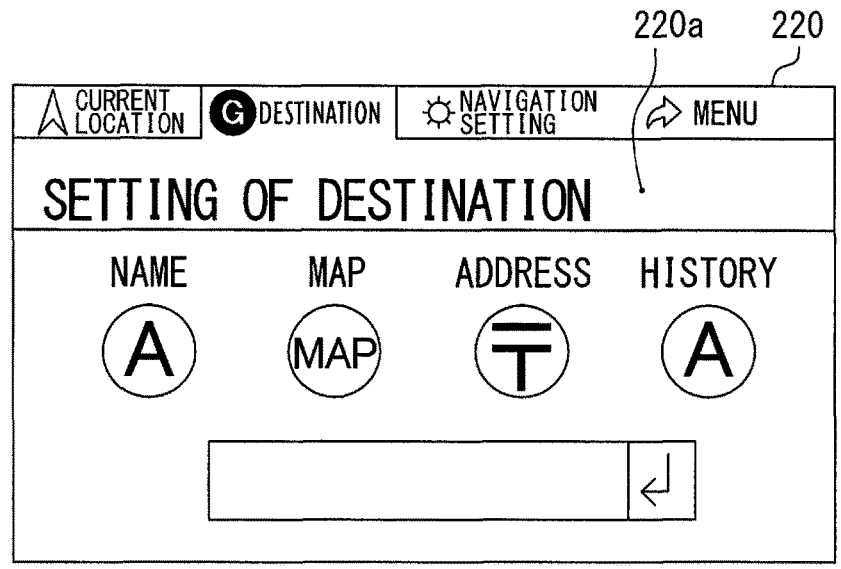
FIG. 7A is a diagram illustrating an appearance in which a setting screen of a destination is displayed on a display screen as a setting image according to the second embodiment.
Figure 7B:
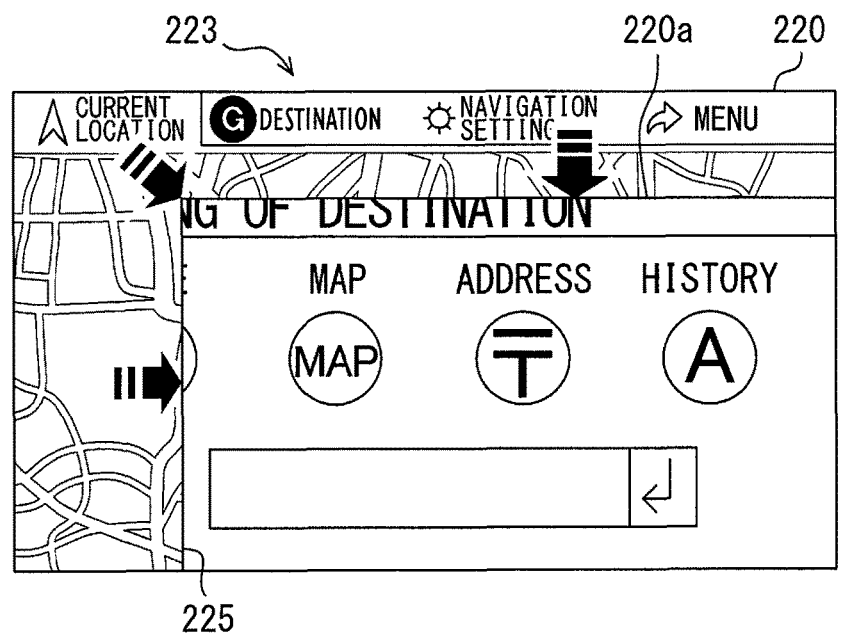
FIG. 7B is a diagram illustrating an appearance in which the setting image starts to move from an upper edge and a left edge toward a lower right direction on the display screen.
Figure 7C:
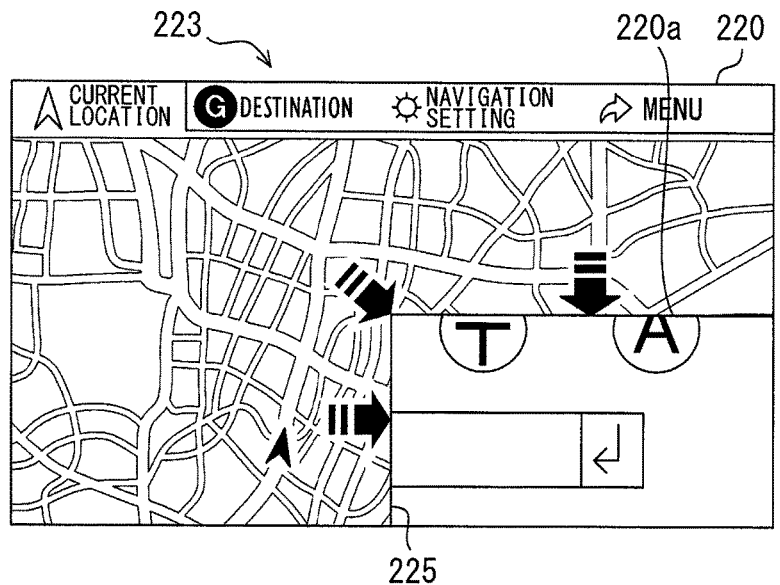
FIG. 7C is a diagram illustrating an appearance in which the setting image becomes smaller, and the setting disable image is increased on the display screen.
Figure 7D:
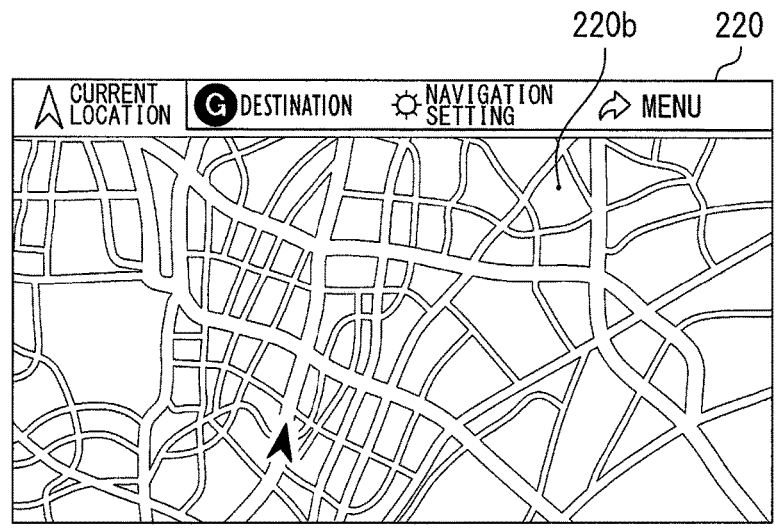
FIG. 7D is a diagram illustrating an appearance in which the setting image has been switched to a guidance image that is the setting disable image on the display screen.

FIGS. 7A to 7D illustrate a series of states in which the setting image 220a is switched to the setting disable image 220b in a stated order of FIGS. 7A, 7B, 7C, and 7D. As illustrated in FIG. 7A, in the second embodiment, a setting screen of a destination of a navigation system 231 is shown as the setting image 220a. As illustrated in FIG. 7D, an image in which the navigation system 231 is performing navigation is used as the setting disable image 220b.

The setting image 20a, the setting disable image 20b, and the previous notice display 23 according to the above-described first embodiment display the setting operation region 21 and the traveling display region 24 together. Meanwhile, in the second embodiment, all of the setting image 220a is a region for setting the operation content of a vehicle-mounted device 230, and all of the setting disable image 220b is a region for displaying information on the driving operation. In addition, the setting image 220a is changed, and a process of the change is displayed as a previous notice display 223.

The image indicative of a route to a destination of the navigation system 231 is used as the setting disable image 220b in the second embodiment. However, as described above, the setting disable image 220b is not limited to the vehicle speed as in the first embodiment, but information updated in real time (displayed instantaneously) and used for the driving operation during the driving of the vehicle 1 is preferable as the setting disable image 220b.

Now, the previous notice display 223 will be described. In the first embodiment, the traveling display region 24 is gradually expanded and deformed so as to be switched from the setting image 20a to the setting disable image 20b. On the other hand, in the second embodiment, the display region of the setting image 220a is gradually narrowed. With this configuration, a boundary 225 between the setting image 220a and the setting disable image 220b is moved from an upper edge and a left edge of the display screen 220 toward a lower right direction as illustrated in FIGS. 7B and 7C. With the movement, the display region of the setting disable image 220b is increased in a state to be originally present on a lower surface of the setting image 220a.

In order to continuously change a state in which the setting image 220a is displayed to switch from the setting image 220a to the setting disable image 220b, a size of the display region can be merely changed without being limited to the expansion and deformation as in the first embodiment. Alternatively, the size of the display region is not merely changed, but a reduction scale of the setting image 220a may be decreased to gradually reduce the display region of the setting image 220a.

Third Embodiment

In the second embodiment described above, the display region of the setting image 220a is gradually reduced to provide the previous notice display 223. However, the setting image has only to become gradually invisible. For example, brightness of a setting image 320a may be gradually increased and faded out to provide a previous notice display 323. Hereinafter, differences of a third modification from the above-described second embodiment will be mainly described in brief.

Figure 8A:
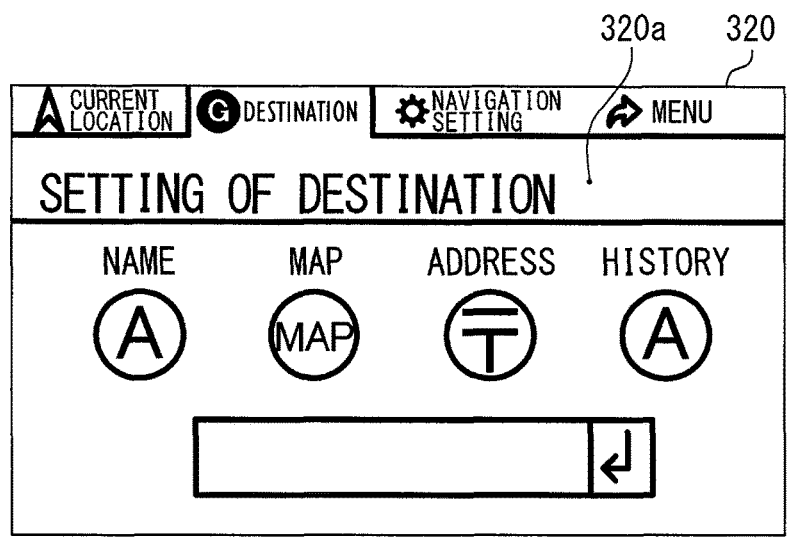
FIG. 8A is a diagram illustrating a setting image on a display screen according to a third embodiment.
Figure 8B:
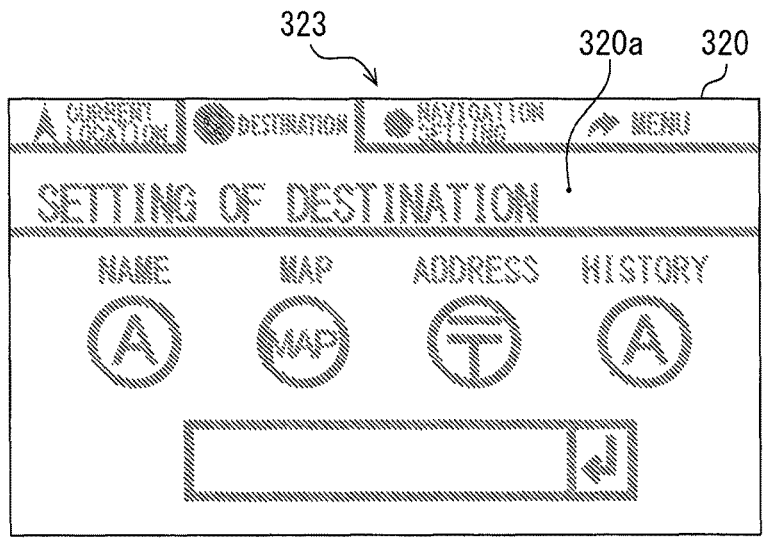
FIG. 8B is a diagram illustrating an appearance in which a brightness of the setting image gradually increases, and starts to fade out on the display screen.
Figure 8C:
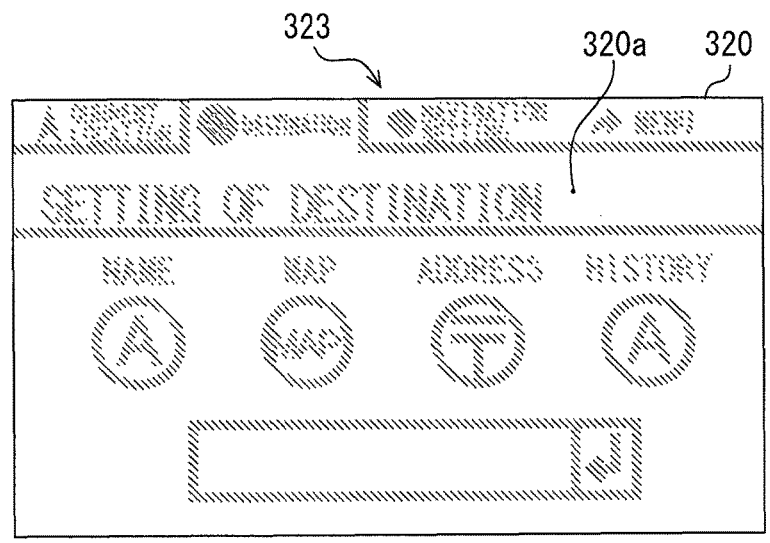
FIG. 8C is a diagram illustrating an appearance in which the brightness of the setting image further increases, and fades out on the display screen.
Figure 8D:
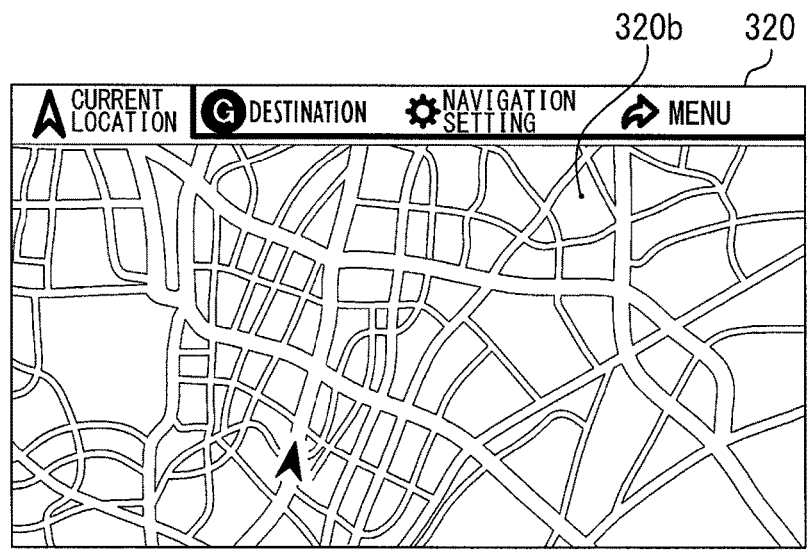
FIG. 8D is a diagram illustrating an appearance in which the setting image has been switched to the setting disable image on the display screen.

FIGS. 8A to 8D illustrate a series of states in which a setting image 320a is switched to a setting disable image 320b on a display screen 320 in a stated order of FIGS. 8A, 8B, 8C, and 8D. In other words, brightness of the setting image 320a is gradually increased and faded out to provide the previous notice display 323 (FIGS. 8A, 8B, and 8C), and thereafter the setting image 320a is switched to a setting disable image 320b (FIG. 8D).

As described above, in switching from the setting image 320a to the setting disable image 320b, parameters related to the luminance, the contrast, the other color attributes, and an outline of the setting image 320a can be changed to provide the previous notice display 323.

Meanwhile, in the second embodiment, the display region of the setting disable image 220b is increased in a state to be originally present on the lower surface of the setting image 220a while the display region of the setting image 220a is reduced. In the third embodiment, the setting image 320a is faded out to provide the previous notice display 323, and the setting image 320a is instantaneously switched to the setting disable image 320b at the same when the fade-out of the setting image 320a has been completed. In other words, in a process of switching from the setting image 320a to the setting disable image 320b, the setting image 320a does not need to be fully continuously changed, but an intermittent change may be provided anywhere in the continuous change.

In addition, the setting disable image 320b may be faded in without being limited to a configuration in which the setting image 320a is faded out. In this situation, if a transmittance of both the images is controlled to perform cross-fade, the display of the setting image 320a can remain as it is during the previous notice display 323.

Fourth Embodiment

In addition, in the second embodiment and the third embodiment described above, the previous notice display continuously changed is used. However, the previous notice display does not always need to be continuously changed. For example, an image such as a countdown in which images of digits are displayed at intervals can be intermittently added and used as the previous notice display. In the following description, differences of a fourth embodiment from the second embodiment and the third embodiment will be mainly described in brief.

Figure 9A:
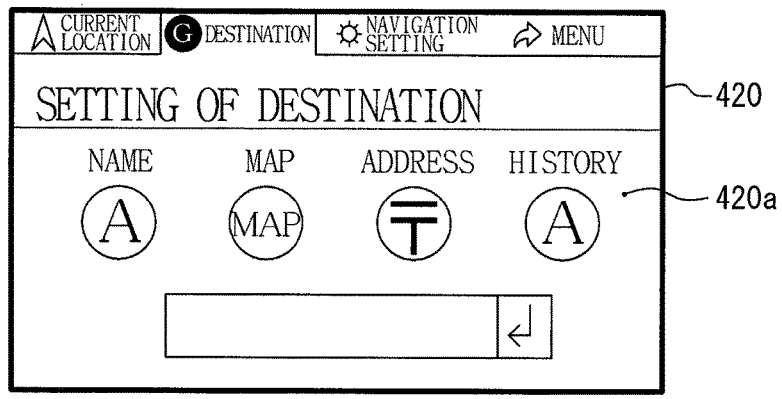
FIG. 9A is a diagram illustrating a setting image on a display screen according to a fourth embodiment.
Figure 9B:
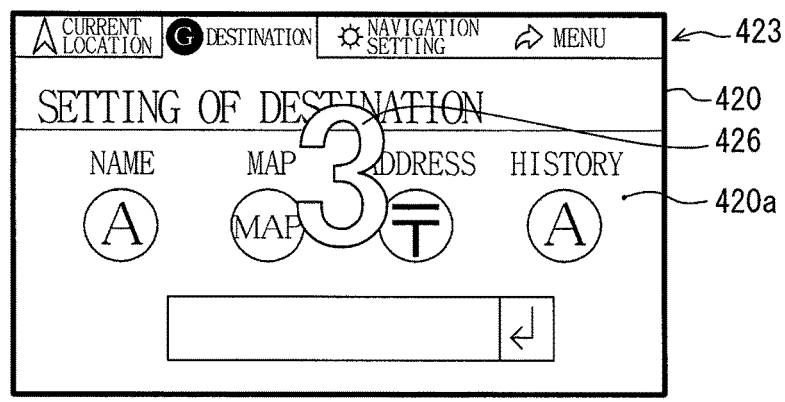
FIG. 9B is a diagram illustrating an appearance in which a first previous notice image for previously notifying that the setting image is to be switched to the setting disable image is displayed on the display screen.
Figure 9C:
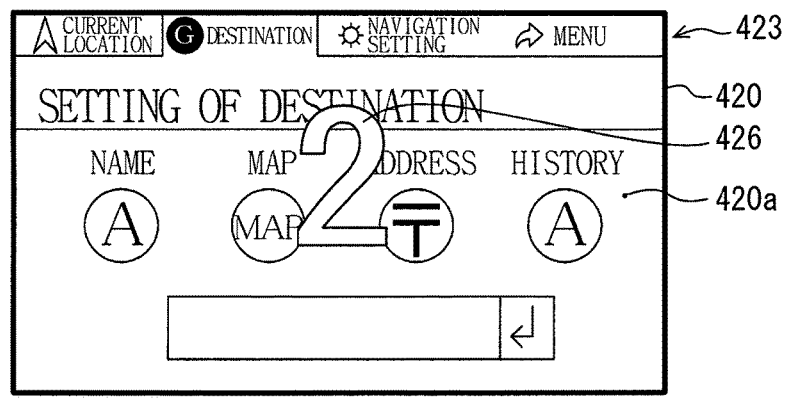
FIG. 9C is a diagram illustrating an appearance in which a second previous notice image for previously notifying that the setting image is to be switched to the setting disable image is displayed on the display screen.
Figure 9D:
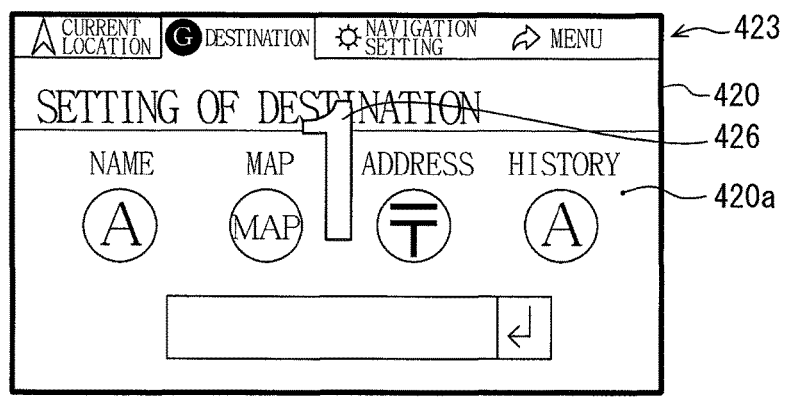
FIG. 9D is a diagram illustrating an appearance in which a third previous notice image for previously notifying that the setting image is to be switched to the setting disable image is displayed on the display screen.
Figure 9E:
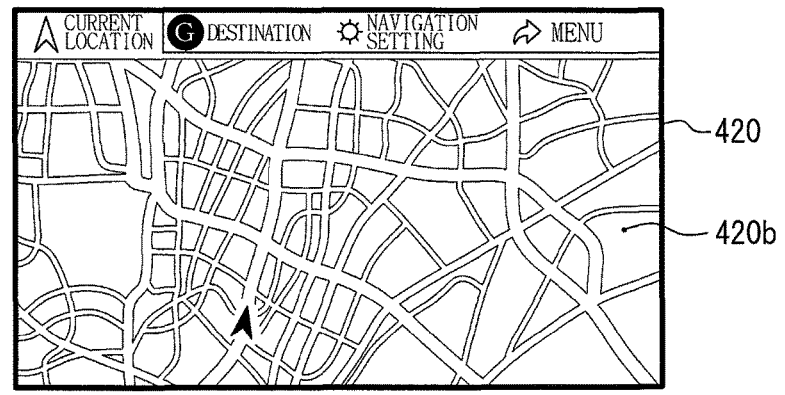
FIG. 9E is a diagram illustrating an appearance in which the setting image is switched to the setting disable image on the display screen.

FIGS. 9A to 9E illustrate a series of states in which a setting image 420a is switched to a setting disable image 420b on a display screen 420 in a stated order of FIGS. 9A, 9B, 9C, 9D, and 9E. In this example, as illustrated in FIGS. 9B to 9D, multiple previous notice images 426 such as "3", "2", and "1" are displayed with a change on the setting image 420a, and displayed as the countdown to provide a previous notice display 423.

Because the respective previous notice images 426 superimposed and displayed on the setting image 420a are indicative of "3", "2", and "1", most of the display of the setting image 420a can be kept in a visible state. In addition, the countdown is generally recognized as a technique indicative of the number of seconds until reaching a specific moment or situation of a thing, as a result of which an image switching can be intuitively transmitted to a driver, and therefore is preferable as the previous notice display 423.

The previous notice display 423 according to the fourth embodiment is not continuously changed as in the embodiments described above, but a process for the change is fully intermittently changed. As the other intermittent changes, there are a movement in a vertical direction, a movement in a horizontal direction, and a switching of light and dark.

As the previous notice display 423 having a configuration in which the previous notice images 426 are added, there is, for example, an animation in which a mascot is greeting someone, in addition to the above countdown. As described above, even when the previous notice image 426 is added, the previous notice image 426 can be continuously changed without being limited to a configuration in which the previous notice images 426 are intermittently changed. Further, the previous notice display 423 can be provided with a configuration in which the previous notice image 426 is additionally superimposed on the setting image 420*a* while the setting image 420*a* is continuously changed.

As described above, in order to provide the previous notice display in switching from the setting image to the setting disable image, there are various methods in which the setting image is continuously changed as in the first embodiment to the third embodiment, and the previous notice image that is another display is added to the setting image, and intermittently changed as in the fourth embodiment. In other words, if the image is switched from the state in which the setting image is displayed to the setting disable image due to a temporal change, such a configuration can be used as the previous notice display of the present disclosure, and a situation of the vehicle-mounted device whose setting operation becomes disabled, and a state in which the setting operation yet tries to be continued can be avoided.

In the vehicular image display device 1 and the vehicular image display method according to the present disclosure, when it is determined that there is a need to limit the operation of setting the vehicle-mounted device according to the detection result of the driving load in a state where the setting image (an image for setting the operation content for the vehicle-mounted device) is displayed on the display screen, the display of the display screen is changed to a state in which the setting disable image (an image indicating that the operation content cannot be set for the vehicle-mounted device) is displayed. When it is determined that there is no need to limit the operation of setting the vehicle-mounted device 30, the display of the display screen 20 is changed from a state in which the setting disable image is displayed to a state in which the setting image is displayed. Prior to the change in those states, the previous notice display for noticing that the setting disable image is displayed or the setting image is displayed is executed.

With the above configuration, when the setting image is displayed, the driver recognizes that the operation of setting the vehicle-mounted device is soon limited at a time when the previous notice display has been started. When the setting disable image is displayed, the driver recognizes that the limit of the operation of setting the vehicle-mounted device is soon canceled (or reduced) at the time when the previous notice display has been started. Thus, the driver can prepare for switching his feeling while the previous notice display is being displayed. When the setting disable image or the setting image is thereafter displayed, even if the driver feeling has not completely been switched, the driver feeling can be switched with such a display as a trigger.

(First Modification)

In the various embodiments described above, when the driving load on the driver is increased due to a start of the travel of the vehicle 1, various functions displayed in the setting images 20*a*, 220*a*, 320*a*, and 420*a* (hereinafter referred to the setting image 20*a* and so on) can be no longer used concurrently. However, a part of the functions can be prevented from being used according to the degree of driving load.

Figure 10A:
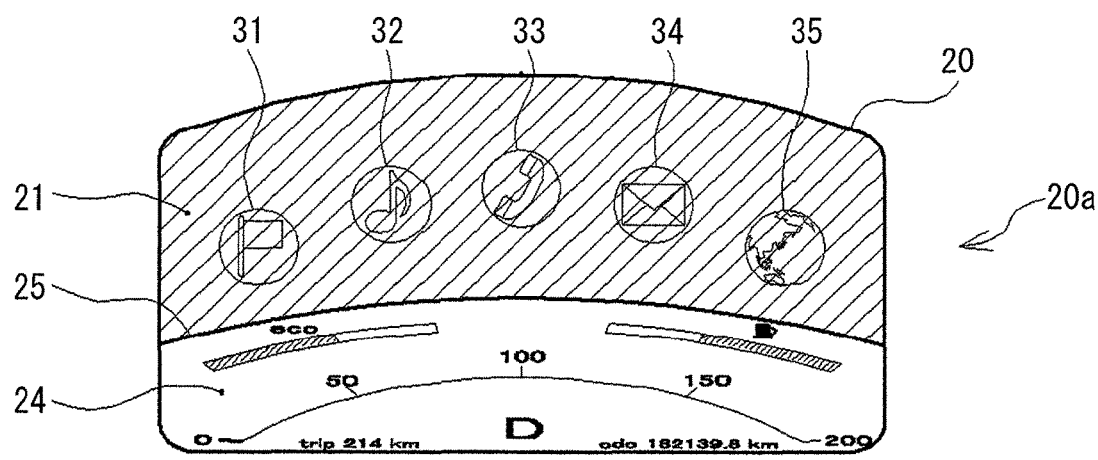
FIG. 10A is a diagram illustrating an image of a display screen in a state where a driving load is hardly applied on a driver.
Figure 10B:
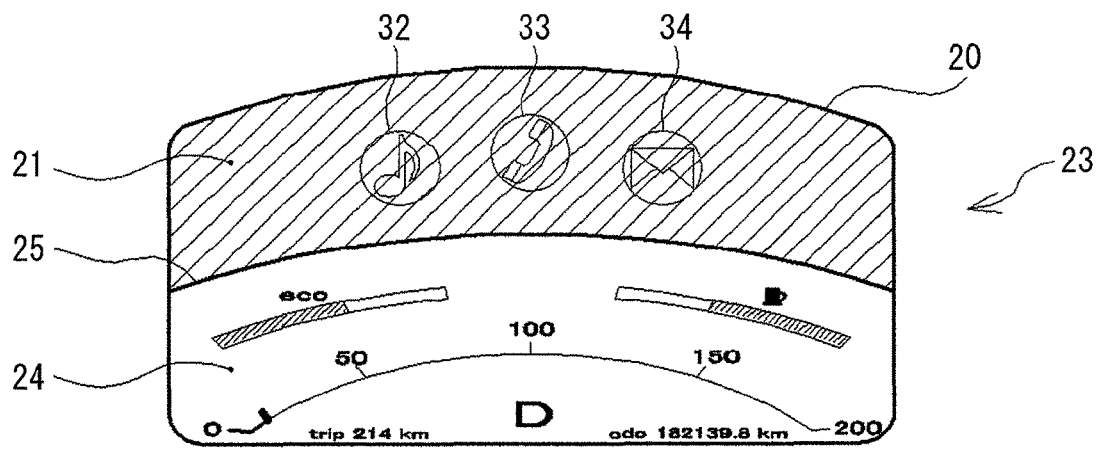
FIG. 10B is a diagram illustrating an image of the display screen in a state where the driving load is slightly applied on the driver.
Figure 10C:
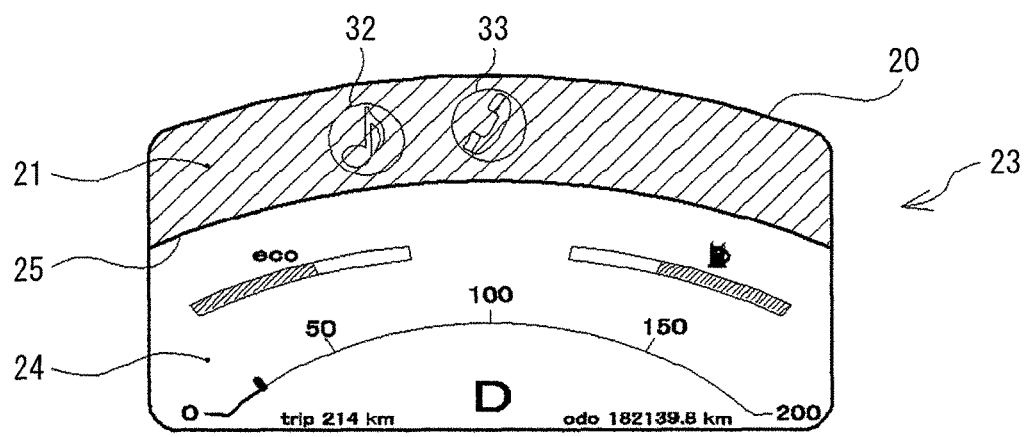
FIG. 10C is a diagram illustrating an image of the display screen in a state where the driving load is further increased.
Figure 10D:
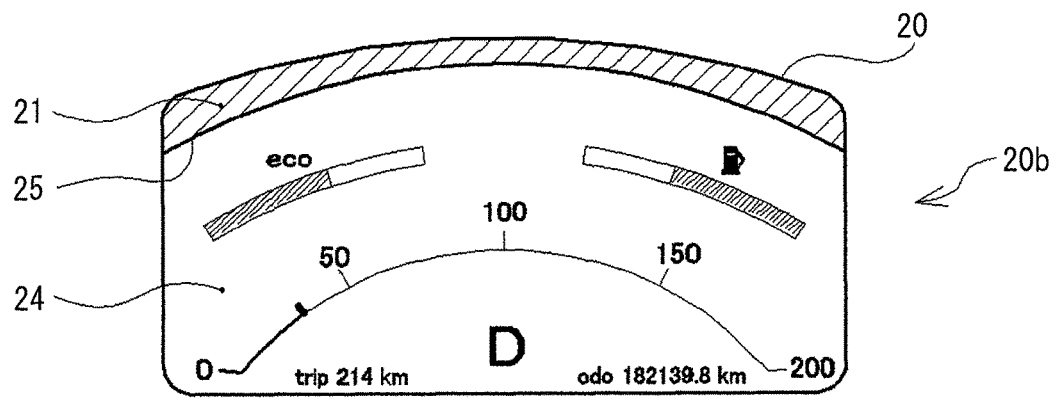
FIG. 10D is a diagram illustrating an image of the display screen in a state where a heavy driving load is applied on the driver.

FIGS. 10A to 10D illustrate a state in which the image of the display screen 20 is changed in the above modification. FIG. 10A illustrates a state in which the driving load is hardly applied on the driver, FIG. 10B illustrates a state in which the driving load is a little applied, FIG. 10C illustrates a state in which the driving load is further increased, and FIG. 10D illustrates a state in which a large driving load is applied.

In the state where the driving load is hardly applied on the driver, as illustrated in FIG. 10A, all functions of "a navigation system 31", "an audio 32", "a phone 33", "a mail 34", and "an internet 35" are available.

However, when the driving load is a little increased, two functions of the "navigation system 31" and the "internet 35" which are relatively large in the operation load for the driver become unavailable. With this situation, in the setting image 20*a*, as illustrated in FIG. 10B, two images representing the navigation system 31 and the internet 35 are no longer displayed.

When the driving load is further increased, the function of the "mail 34" becomes unavailable next time, and with this situation, in the setting image 20*a*, an image representing the mail 34 is no longer displayed (refer to FIG. 10C). When the driving load is further increased, the functions of the "audio 32" and the "phone 33" cannot be also used, and in this stage, as illustrated in FIG. 10D, the setting image 20*a* is obscured by the setting disable image 20*b*.

In the above modification, since the use of a part of the functions is merely limited while the driving load is low, the convenience of the driver is not hindered. Further, when the driving load is more increased, the unavailable functions are gradually increased, and all of the functions cannot be eventually used. Thus, because the driver can be prompted to give up the use of those functions until all of the functions become unavailable, a situation in which the driver tries to operate indefinitely can be prevented.

(Second Modification)

In the various embodiments described above, when the vehicle 1 starts to travel, the displays of the display screens 20, 220, 320, and 420 (hereinafter referred to as "display screen 20 and so on") are changed from the setting image 20*a* and so on to setting disable images 20*b*, 220*b*, 320*b*, and 420*b* (hereinafter referred to as "setting disable image 20*b* and so on"), respectively. In this situation, the previous notice displays 23, 223, 323, and 423 (hereinafter referred to as "previous notice display 23 and so on") are executed. The previous notice display 23 and so on are executed by switching from a state in which the setting image 20*a* and so on are displayed to the setting disable image 20*b* and so on due to a temporal change. As described above, the previous notice display is not limited to a case in which the setting image 20*a* and so on are changed to the setting disable image 20*b* and so on as in the embodiments described above, but can be executed when changing (returning) from the setting disable image 20*b* and so on to the setting image 20*a* and so on. In the present modification, the previous notice display in this situation will be described.

The previous notice display according to the present modification is to get the driver to previous notice that the setting image 20*a* is displayed prior to the change to the setting image 20*a*.

The display control process of the previous notice display is substantially identical with the process in the embodiments described above. In other words, the vehicle speed signal is acquired, and it is determined whether the vehicle 1 is traveling (degree of driving load), and when the vehicle 1 stops (when the driving load becomes low), the setting disable image 20*b* is changed to the setting image 20*a*. The change in the image is performed with the temporal change to execute the previous notice display. Since the other configurations and the various previous notice display modes in the present modification are identical with the various embodiments described above, their description will be omitted.

The previous notice display 23 and so on in the embodiments described above promote the driver feeling to switch from the operation of setting the vehicle-mounted devices 30 and 230 to the operation of driving the vehicle 1. In the present modification, likewise, the driver feeling is promoted to be switched. In other words, when the setting disable image 20b is switched to the setting image 20a in association with a situation in which the vehicle 1 stops to make the vehicle-mounted device 30 operable, if the previous notice display is performed, the driver recognizes that the setting image 20a is displayed shortly. Thereafter, since the setting image 20a is actually displayed, the driver can smoothly switch his consciousness concentrated on the driving operation to the consciousness for operating the setting of the vehicle-mounted device 30. Therefore, the driver can start the operation of setting the vehicle-mounted device 30 without any delay after the switching of the image has been completed.

In addition, because the previous notice display is executed by gradually switching from the setting disable image 20b to the setting image 20a, the previous notice display is accompanied by the movement of the displayed image. As described above, when the displayed image is moved during the execution of the previous notice display, the driver pays attention to the moved image, and can be aware that the vehicle-mounted device 30 becomes operable without any delay. For that reason, for example, even when the driver interrupts the operation of setting the vehicle-mounted device 30, and drives the vehicle 1, the driver does not need to pay attention to wait for a moment when switching to the setting image 20a, and can concentrate on the driving.

In the present modification, it is preferable that the setting image 20a is not changed to the setting disable image 20b unless 0.5 to 3 seconds are elapsed after the change from the setting image 20a to the setting disable image 20b described in the first embodiment has been completed. With the above configuration, even in a scene where a stop and a start are repeated such as a traffic congestion, the switching is frequently performed between the setting image 20a and the setting disable image 20b, thereby being capable of avoiding a situation in which attention is deflected from driving conversely.

In both of changing from the setting image 20a to the setting disable image 20b and changing from the setting disable image 20b to the setting image 20a, the execution of the previous notice display is preferable as the embodiment of the present disclosure. Without being limited to this configuration, in only any one of changing from the setting image 20a to the setting disable image 20b and changing from the setting disable image 20b to the setting image 20a, the previous notice display can be executed to implement the present disclosure.

A flowchart or a process of the flowchart described in the present disclosure includes multiple parts (or steps), and each part is expressed, for example, as S101. Further, each part can be divided into multiple sub-parts. On the other hand, the multiple parts can be combined into one part. Further, the respective parts configured as described above can be referred to as circuit, device, module, or means.

Each or the combination of the above multiple parts can be realized with or without the inclusion of the functions of an associated device as not only (i) a part of software combined with a hardware unit (for example, a computer), but also (ii) a part of hardware (for example, integrated circuit, wired logic circuit). Further, the part of hardware can be configured inside of a microcomputer.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A vehicular image display device that controls a display of a display screen mounted at a position visible from a driver seat, comprising:
    a detection unit that detects a travel start of a vehicle in response to a detection of a driving load applied to a driver of the vehicle;
    a setting image display unit that displays a setting image for setting a plurality of operation contents for a vehicle-mounted device, the plurality of operation contents in the setting image indicate different operations of the vehicle-mounted device which are allowed under the driving load currently applied to the driver;
    an image change unit that changes the setting image of the display screen to a setting disable image indicating that the setting of the plurality of operation contents for the vehicle-mounted device is disabled and including a display of a vehicle speed when the detection unit detects the travel start of the vehicle; and
    a previous notice execution unit that executes a previous notice display by continuously moving a boundary between an area in which the setting image is displayed and an area in which the setting disable image is displayed on the display screen so as to increase the area of the setting disable image, prior to a change to the setting disable image,
    wherein
    during a moving of the boundary between the area in which the setting image is displayed and the area in which the setting disable image is displayed,
    the image change unit:
        forbids a display of one or more of the plurality of operation contents which is not allowed to be operated under the driving load currently applied to the driver; and
        displays remaining of the plurality of operation contents which is allowed to operate under the driving load currently applied to the driver.

2. The vehicular image display device according to claim 1, wherein
    the setting disable image is an image including a route to a destination.

3. A vehicular image display method for controlling a display of a display screen mounted at a position visible from a driver seat, comprising:
    determining whether a setting image for setting a plurality of operation contents for a vehicle-mounted device is being displayed;
    determining whether a vehicle starts to travel in response to a detection of a driving load applied to a driver of the vehicle, the plurality of operation contents indicating different operations of the vehicle-mounted device which are allowed under the driving load applied to the driver;
    changing the setting image on the display screen to a setting disable image indicating that the setting of the plurality of operation contents for the vehicle-mounted device is disabled and including a display of a vehicle speed when the vehicle starts to travel; and
    previously notifying that the setting disable image is to be displayed by continuously moving a boundary between an area in which the setting image is displayed and an area in which the setting disable image is displayed on the display screen so as to increase the area of the setting disable image, prior to a change to the setting disable image,
wherein
during a moving of the boundary between the area in which the setting image is displayed and the area in which the setting disable image is displayed,
   forbidding a display of one or more of the plurality of operation contents which is not allowed to be operated under the driving load currently applied to the driver, and
   displaying remaining of the plurality of operation contents which is allowed to operate under the driving load currently applied to the driver.

\* \* \* \* \*